No. 896,279. PATENTED AUG. 18, 1908.
J. DORNBERGER.
CAR FENDER.
APPLICATION FILED SEPT. 20, 1907.
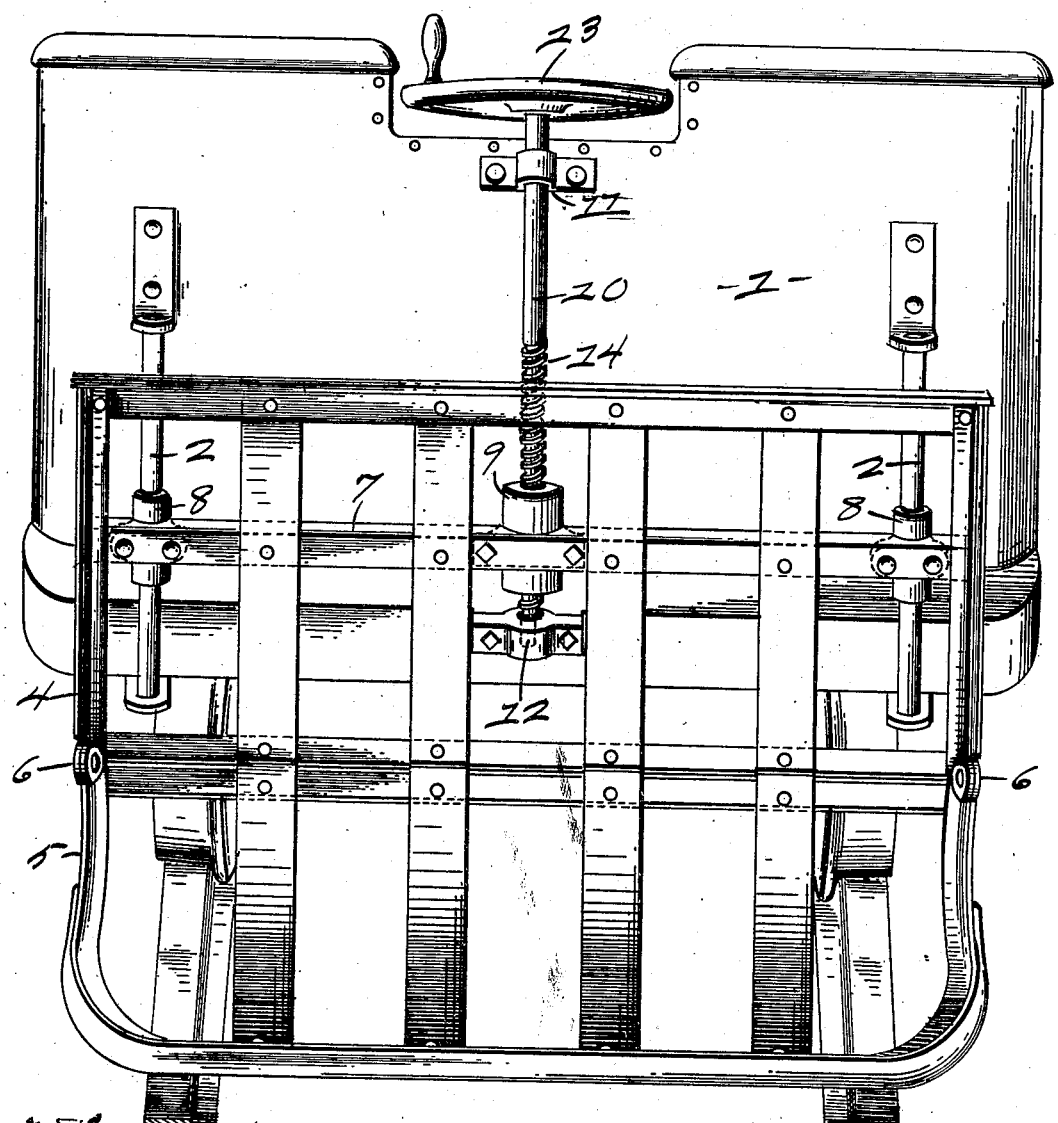

UNITED STATES PATENT OFFICE.

JOSEPH DORNBERGER, OF TOLEDO, OHIO.

CAR-FENDER.

No. 896,279.  Specification of Letters Patent.  Patented Aug. 18, 1908.

Application filed September 20, 1907. Serial No. 393,757.

*To all whom it may concern:*

Be it known that I, JOSEPH DORNBERGER, of Toledo, county of Lucas, and State of Ohio, have invented certain new and useful Improvements in Car-Fenders; and I do hereby declare that the following is a full, clear, and exact description thereof, which will enable others skilled in the art to which it appertains to make and use the same, reference being had to the accompanying drawings, and to the figures of reference marked thereon, which form part of this specification.

This invention relates to improvements in car fenders and it has for its object to provide a car with a fender which is capable of ready adjustment in a vertical direction to and from the rails.

The invention embodies the novel combination, arrangement, and details of construction hereinafter shown, described and claimed.

In the accompanying drawing, the single figure shows a front perspective view of a fender mounted for vertical adjustment upon a car, the same embodying my invention.

Referring to the details, 1 indicates the forward end of a car to which are secured at the sides rigid vertical guide-rods 2. The fender 3 is preferably built up of light angular and band steel in two sections 4 and 5, the section 5 being hinged at the sides at 6 to the section 4 to permit the same to be folded up when not in use. Forming part of the fender frame is a transverse bar 7 at the outer ends of which are mounted elongated guide-pieces 8 adapted to traverse the guide-rods 2 the fender being held from tilting either sidewise or forwardly owing to the elongation of the guide-pieces. At a central point upon the transverse bar 7 is mounted an internally threaded casting 9 adapted to operate along a threaded shaft 10 mounted for rotation upon a vertical axis in bearings 11 and 12, a hand-wheel 13 being provided at the upper end of the shaft to permit convenient operation. The screw-threads 14 upon the shaft 10 are of quick pitch, so that two or three rotations of the shaft 10 will cause the fender to raise or lower several inches. The construction disclosed provides an extremely rigid mounting for a fender and one which is of especial value for use on interurban cars, the fender being capable of being elevated a considerable height above the rails while the car is being operated outside of corporation limits and being capable of being lowered close to the rails while the car is within such limits.

Having described my invention, what I claim and desire to secure by Letters Patent is:—

In a car fender, vertical guide-rods secured at the sides of the forward end of a car, a fender section having a rigid bar disposed transversely thereof, elongated guide-pieces supported at the ends of said bar and operable along the guide-rods, an internally threaded casting supported at a central point upon the bar, and a screw-threaded operating shaft rotatable upon a vertical axis and adapted to engage the internally threaded casting to adjust the position of the fender in a vertical direction.

In testimony, that I claim the foregoing as my own I affix my signature, in presence of two witnesses.

JOSEPH DORNBERGER

Witnesses:
CARL H. KELLER,
GRANT WILLIAMS.